(12) United States Patent
Gautrot

(10) Patent No.: US 8,347,626 B2  
(45) Date of Patent: Jan. 8, 2013

(54) METHOD OF CONTROLLING THE INTAKE OF A SUPERCHARGED INTERNAL-COMBUSTION ENGINE COMPRISING A BURNT GAS SCAVENGING OPERATION

(75) Inventor: Xavier Gautrot, Rueil Malmaison (FR)

(73) Assignee: IFP, Cedex (FR)

( * ) Notice: Subject to any disclaimer, the term of this patent is extended or adjusted under 35 U.S.C. 154(b) by 399 days.

(21) Appl. No.: 12/813,617

(22) Filed: Jun. 11, 2010

(65) Prior Publication Data

US 2010/0313856 A1 Dec. 16, 2010

(30) Foreign Application Priority Data

Jun. 12, 2009 (FR) ...................................... 09 02848

(51) Int. Cl.
*F02B 33/44* (2006.01)
(52) U.S. Cl. .............. 60/605.1; 60/601; 60/602; 60/611
(58) Field of Classification Search ................... 60/601, 60/602, 605.1, 611, 613
See application file for complete search history.

(56) References Cited

U.S. PATENT DOCUMENTS 4,622,816 A * 11/1986 Boudigues ...................... 60/606

FOREIGN PATENT DOCUMENTS

FR 2 841 294 A1 12/2003

* cited by examiner

*Primary Examiner* — Ching Chang
(74) *Attorney, Agent, or Firm* — Antonelli, Terry & Stout & Kraus, LLP.

(57) ABSTRACT

The present invention relates to a method of controlling the intake of a supercharged engine comprising a cylinder (10) with at least two intake pipes (12, 14) associated with their intake valves (16, 18) and connected to an intake distributor (30), and at least one exhaust pipe (20) with its exhaust valve (22), a method according to which, before the end of the exhaust phase of said engine, an exhaust gas scavenging operation is carried out by overlap of exhaust valve (22) and intake valve (16) and, at the end of the scavenging operation, a stage of fuel mixture preparation is performed for combustion of this mixture in said cylinder.

According to the invention, the method consists in introducing supercharged air from a first zone (38) of the intake distributor to carry out the scavenging operation, in using supercharged air from a second zone (40) of the distributor to produce a fuel mixture for the cylinder and, after the end of the intake phase, in sending to this second zone (40) part of the fuel mixture contained in the cylinder.

6 Claims, 1 Drawing Sheet

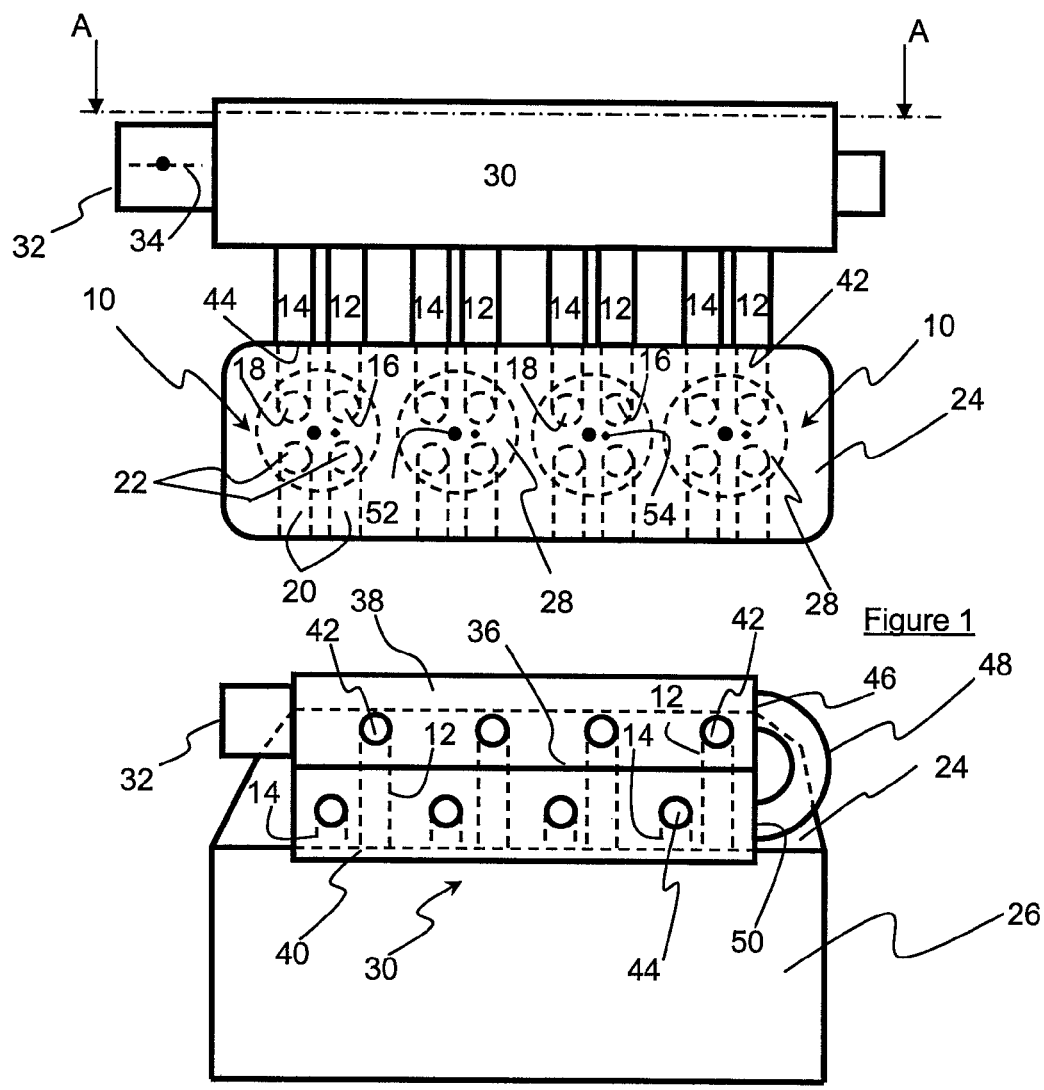
Figure 1
Figure 2
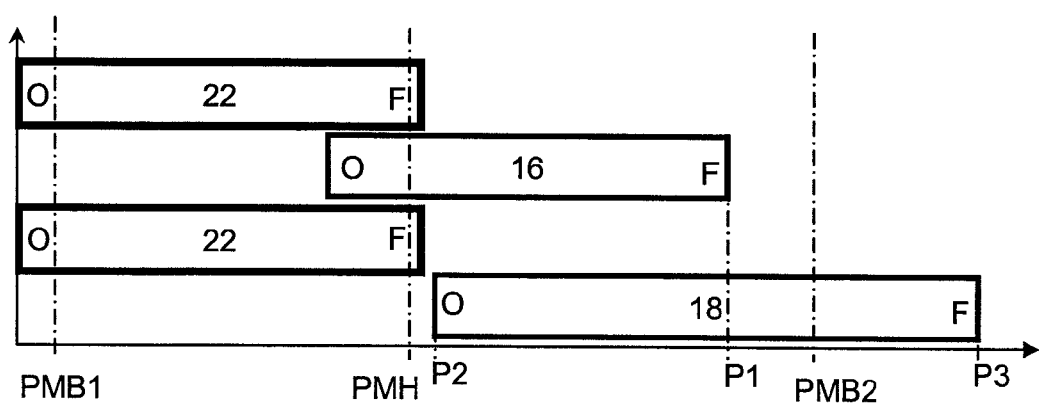
Figure 3

METHOD OF CONTROLLING THE INTAKE OF A SUPERCHARGED INTERNAL-COMBUSTION ENGINE COMPRISING A BURNT GAS SCAVENGING OPERATION

FIELD OF THE INVENTION

The present invention relates to a method of controlling the intake of a supercharged internal-combustion engine comprising a burnt gas scavenging operation.

BACKGROUND OF THE INVENTION

As it is widely known, it is common practice to use, for such an engine type, an intake air that is compressed, generally referred to as supercharging air, for feeding its cylinders. This allows to increase the power of this engine that is intrinsically dependent on the amount of air allowed into the combustion chamber of these cylinders.

It is also known to increase even further the power of this type of engine by carrying out an operation referred to as burnt gas scavenging. It consists in discharging, at the start of the intake phase of this engine, the residual exhaust gases contained in the combustion chamber at the end of the exhaust phase in order to replace them by supercharged air. This operation is generally carried out by overlap of the exhaust and intake valves.

The problem of transfer of the carbureted supercharged air directly to the exhaust upon valve overlap arises during this scavenging operation. In fact, during this transfer, part of the carbureted supercharged air is discharged through the engine exhaust and sent to the atmosphere. This discharge sends unburnt hydrocarbons, which are pollutants harmful to the environment and to mankind, in the ambient air.

In order to prevent such a problem, in French patent application No. 2,841,294 filed by the applicant, the burnt gas scavenging operation is carried out by adding and using an additional intake pipe with its valve, specifically to introduce non-carbureted supercharged air.

This type of device thus consists of a specific intake pipe (with its valve) for introduction of the non-carbureted supercharged air used during the scavenging operation in the combustion chamber and of another intake pipe, also with its valve, for allowing carbureted supercharged air upon closure of the specific intake pipe.

Thus, the burnt gas scavenging operation is carried out by overlap of the exhaust valve and of the non-carbureted supercharged air intake valve of the cylinder considered. During this overlap, the non-carbureted supercharged air allowed into the combustion chamber replaces the residual burnt gases that are discharged through the exhaust valve to the exhaust manifold, then the exhaust line.

Once this scavenging operation complete, the other intake pipe is used to prepare a fuel mixture in the combustion chamber.

This also poses a not insignificant problem because the inlets of the carbureted supercharged air and non-carbureted supercharged air intake pipes are generally connected to a single intake distributor.

Mixing between the carbureted supercharged air from the carbureted supercharged air pipes and the non-carbureted air from the non-carbureted supercharged air intake pipes therefore occurs within this distributor. Consequently, during the burnt gas scavenging operation, partly carbureted supercharged air is fed into the combustion chamber prior to being discharged through the exhaust valve with the burnt gases.

This also leads to an unburnt hydrocarbon discharge to the exhaust and to fuel overconsumption.

Furthermore, it may be desired to modify the engine efficiency, notably by changing the compression ratio. One of the two intake valves is therefore kept in open position, generally the carbureted air valve, at the start of the engine compression phase and for some crank angle degrees.

The fuel mixture present in the combustion chamber is therefore not compressed at the start of the engine compression phase and the compression ratio can be modified depending on the closing time of this intake valve. However, carbureted air is fed into the intake pipe and the aforementioned problem remains, with the possibility of mixing with the non-carbureted air used for scavenging.

The present invention thus aims to overcome the aforementioned problems by means of a method of controlling the intake of a supercharged internal-combustion engine that allows to carry out the burnt gas scavenging operation under conditions minimizing the discharge of unburnt hydrocarbons, for a direct-injection as well as an indirect-injection engine, while keeping the engine performances.

SUMMARY OF THE INVENTION

The present invention thus relates to a method of controlling the intake of a supercharged internal-combustion engine comprising at least one cylinder with at least two intake pipes associated with their intake valves and connected to an intake distributor, and at least one exhaust pipe with its exhaust valve, a method according to which, before the end of the exhaust phase of said engine, a residual exhaust gas scavenging operation is carried out by overlap of exhaust and intake valves and, at the end of the scavenging operation, a stage of preparation of a fuel mixture is performed for combustion thereof in said cylinder, characterized in that it consists in:
  introducing supercharged air from a first zone of the intake distributor to carry out the residual burnt gas scavenging operation,
  using supercharged air from a second zone of the distributor to produce a fuel mixture for the cylinder and,
  after the end of the intake phase, in sending to this second zone of said distributor part of the fuel mixture contained in the cylinder.

The method can consist in feeding said part of the fuel mixture into the second zone through opening of the intake valve controlling the intake pipe connected to this second zone.

The method can consist in using the supercharged air from the second zone of the intake distributor after the start of the engine intake phase.

The method can consist in introducing supercharged air from the first zone of the intake distributor after the residual exhaust gas scavenging operation.

The method can consist in feeding supercharged air successively to the first zone, then the second zone of the intake distributor.

The method can consist in providing two intake distributor zones that are physically distinct from one another.

BRIEF DESCRIPTION OF THE FIGURES

Other features and advantages of the invention will be clear from reading the description hereafter, given by way of non-limitative example, with reference to the accompanying figures wherein:

FIG. 1 diagrammatically shows an internal-combustion engine using the method according to the invention, FIG. 2 is a cross-sectional view along line AA of the engine of FIG. 1, and FIG. 3 illustrates the openings of the various valves as a function of the position of the piston of the engine using the method according to the invention.

DETAILED DESCRIPTION

The example illustrated in FIG. 1 shows a direct-injection supercharged internal-combustion engine, notably a gasoline engine, and preferably a spark-ignition engine. This example is not limitative and the invention described hereafter can also apply to an indirect-injection supercharged internal-combustion engine.

This engine comprises at least one cylinder 10, four cylinders here, with each two types of supercharged air intake pipes 12 and 14 associated each with an intake valve 16 and 18.

What is referred to as supercharged air is either supercharged air alone, or supercharged air to which recirculated exhaust gas (EGR) has been added.

Intake pipe 12 allows non-carbureted supercharged air into the combustion chamber and intake pipe 14 allows a carbureted supercharged air to be produced therein.

For simplification reasons, this intake pipe 12 and its valve are respectively referred to as scavenging pipe and scavenging valve. For the same reasons, pipe 14 and its valve 18 are referred to as carburetion pipe and carburetion valve.

This cylinder also comprises at least one exhaust pipe 20, two here, each with its exhaust valve 22.

The intake and exhaust pipes, as well as their valves, are carried at least partly by a cylinder head 24 fastened to engine block 26 that comprises the cylinders. This cylinder head allows to delimit, with the upper part of a piston (not shown) that slides in the cylinder and the cylinder wall, combustion chamber 28 of the cylinder concerned.

Intake pipes 12 and 14 of each cylinder 10 are each separately connected to an intake distributor 30. This distributor is connected through an inlet 32 to the outlet of an air compression means (not shown) such as a turbocompressor. Inlet 32 is advantageously provided with throttle means 34, a butterfly type valve for example, which allows the amount of supercharged air fed into this distributor to be adjusted.

As illustrated in FIG. 2, intake distributor 30 comprises an inner partition 36 allowing to divide it into two independent zones 38 and 40 distinct from one another. Advantageously, this partition is achieved by a tight wall extending horizontally over the greater length of the distributor and dividing it into two tight parts of substantially equal volume. These two zones thus allow to delimit two half-distributors as explained below.

First half-distributor 38, referred to as scavenging distributor, is located on the upper part of distributor 30 (considering FIG. 2) and it comprises supercharged air inlet 32 with its throttle means 34, and it allows to feed through orifices 42, referred to as scavenging orifices, each scavenging pipe 12 associated with its valve 16.

Second half-distributor 40, referred to as carburetion distributor, which is located below the scavenging distributor, comprises orifices 44, referred to as carburetion orifices, allowing to communicate carburetion pipes 14 and their valves 18 with the inside of this carburetion distributor. Scavenging distributor 38 also comprises a supercharged air outlet 46 allowing to feed supercharged air, through a line 48, to an air inlet 50 provided in the carburetion distributor.

Thus, throughout engine operation, supercharged air flows through inlet 32 into scavenging distributor 38 while feeding pipes 12 through orifices 42, then it feeds, through line 48, orifices 44 of carburetion distributor 40 for pipes 14.

The air therefore circulates in series from scavenging distributor 38 to carburetion distributor 40 without any possibility of air mixing between the two distributors. In fact, scavenging orifices 42 and carburetion orifices 44 are physically separated from one another by wall 36 and there is no possible communication between them.

In the example described, cylinders 10 also comprise a fuel injection means such as a multi-jet injector 52 allowing fuel to be fed into combustion chambers 28 so that it mixes with the fluid contained therein.

These cylinders also carry a fuel mixture ignition means such as a spark plug 54.

Of course, without being explicitly illustrated in the figures, opening and closing of intake valves 16, 18 is controlled by any actuating means allowing the lift laws thereof to be varied, in particular as regards their spreads and/or their opening/closing times, independently of one another. These means are known as VVT (Variable Valve Timing) or VVL (Variable Valve Lift). Means for actuating the valves of VVL type with two cams are advantageously used. For the exhaust valves, conventional actuating means such as a camshaft are advantageously used.

As it is widely known, injectors 52 and plugs 54 are conventionally controlled by the engine calculator (not shown) any engine is usually equipped with.

FIG. 3 illustrates the various opening laws of the intake 16, 18 and exhaust 22 valves between an open position (O) and a closed position (F) of their respective pipes 12, 14, 20, according to the position of the piston.

During the engine exhaust phase and in the vicinity of the exhaust bottom dead center (PMB1) of the piston, exhaust valves 22 open (position O), then they close again (position F) in the vicinity of the top dead center (PMH) of the piston. During this travel, the major part of the exhaust gases contained in the combustion chamber is discharged to exhaust pipes 20.

Before these exhaust valves close again, the exhaust gas scavenging operation takes place. An overlap between exhaust valves 22 and scavenging valve 16 is therefore carried out. More precisely, scavenging valve 16 opens before the top dead center and before exhaust valves 22 close. The non-carbureted supercharged air present in scavenging distributor 38 is thus fed into combustion chamber 28 through orifice 42, scavenging pipe 12 and valve 16. This supercharged air, at a higher pressure than the burnt gases present in this chamber, scavenges these residual gases and discharges them through exhaust valve 22 until it is in closed position (F). Thus, non-carbureted supercharged air replaces the exhaust gas usually present in the combustion chamber in the vicinity of the end of the engine exhaust phase.

Exhaust valves 22 being closed after the top dead center of the piston, scavenging valve 16 continues its travel until it closes (position F) at position P1 of the piston before the compression bottom dead center (PMB2) thereof, so as to continue to allow supercharged air into the chamber.

In parallel, carburetion valve 18 opens at position P2 of the piston after some crank angle degrees after the top dead center PMH and it continues its travel until position P3 of the piston, after PMB2, is reached. Of course, this opening can also be achieved at the top dead center PMH without departing from the scope of the invention.

In the case of direct fuel injection, a fuel mixture is generally achieved in the combustion chamber during the intake phase of this engine between PMH and PMB2. This mixture thus results from the addition of fuel through injector 52 to the supercharged air contained in the combustion chamber.

As regards an indirect-injection engine, the injector is placed on carburetion pipe 14 so as to achieve a fuel mixture therein. This fuel mixture is then fed into combustion chamber 28 where it mixes with the supercharged air present in the chamber so as to obtain the final fuel mixture.

In both engine types (direct injection or indirect injection), the combustion chamber thus contains a fuel mixture intended to be burnt during the engine expansion phase.

Considering the open position of the carburetion valve and its closing time at position P3 of the piston, carbureted air is sent into carburetion pipe 14 and carburetion distributor 40, according to the Miller cycle principle. This is due to the fact that the piston has an ascending motion from PMB2 and it therefore drives the fuel mixture towards the valves.

However, since this distributor is physically separated from the scavenging distributor, no mixing occurs between the carbureted supercharged air and the non-carbureted supercharged air contained in these distributors. Furthermore, it is possible to vary the closing time of the carburetion valve from PMH so as to vary as one wants the compression ratio of the engine while preventing mixing between the two supercharged airs.

Subsequently, after the engine compression and expansion phase, the burnt gas scavenging operation is performed only with non-carbureted supercharged air. Furthermore, after this scavenging operation, opening of the carburetion valve allows to introduce, in a first stage, nearly-homogeneous carbureted air, which can only improve the homogeneity of the fuel mixture obtained at the end of the engine intake phase.

The present invention is not limited to the example described above and it encompasses any variant and equivalent.

Notably, intake distributor 30 with its physically distinct scavenging and carburetion distributors can exhibit one of the configurations described more precisely in French patent application No. 2,856,435 filed by the applicant.

The invention claimed is:

1. A method of controlling the intake of a supercharged internal-combustion engine comprising at least one cylinder with at least two intake pipes associated with their intake valves and connected to an intake distributor, and at least one exhaust pipe with its exhaust valve, a method according to which, before the end of the exhaust phase of said engine, a residual exhaust gas scavenging operation is carried out by overlap of exhaust and intake valves and, at the end of the scavenging operation, a stage of preparation of a fuel mixture is performed for combustion thereof in said cylinder, characterized in that it comprises:

introducing supercharged air from a first zone of the intake distributor to carry out the residual burnt gas scavenging operation, using supercharged air from a second zone of the distributor to produce a fuel mixture for the cylinder and, after the end of the intake phase, in sending into this second zone of said distributor part of the fuel mixture contained in the cylinder.

2. An engine intake control method as claimed in claim 1, characterized in that it comprises feeding said part of the fuel mixture into second zone through opening of intake valve controlling intake pipe connected to this second zone.

3. An engine intake control method as claimed in claim 1, characterized in that it comprises using the supercharged air from second zone of intake distributor after the start of the engine intake phase.

4. An engine intake control method as claimed in claim 1, characterized in that it comprises introducing the supercharged air from first zone of intake distributor after the residual exhaust gas scavenging operation.

5. An engine intake control method as claimed in claim 1, characterized in that it comprises feeding supercharged air successively to first zone, then to second zone of intake distributor.

6. An engine intake control method as claimed in claim 1, characterized in that it comprises providing two zones of intake distributor that are physically distinct from one another.

* * * * *